United States Patent
Park et al.

(10) Patent No.: US 9,994,446 B1
(45) Date of Patent: Jun. 12, 2018

(54) MOISTURE ELECTROLYSIS APPARATUS FOR HEADLAMP

(71) Applicants: Hyundai Motor Company, Seoul (KR); Kia Motors Corporation, Seoul (KR)

(72) Inventors: Jae Woo Park, Ansan-si (KR); Sang Shin Lee, Suwon-si (KR); So Yoon Park, Suwon-si (KR); Man Ju Oh, Yongin-si (KR); Jae Woong Kim, Hwaseong-si (KR); So La Chung, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days. days.

(21) Appl. No.: 15/638,977

(22) Filed: Jun. 30, 2017

(30) Foreign Application Priority Data

Dec. 14, 2016 (KR) .................... 10-2016-0170845

(51) Int. Cl.
*F21V 31/03* (2006.01)
*C01B 3/10* (2006.01)
*C01B 3/02* (2006.01)

(52) U.S. Cl.
CPC .............. *C01B 3/10* (2013.01); *C01B 3/02* (2013.01); *F21S 45/20* (2018.01); *F21S 45/33* (2018.01); *F21S 45/60* (2018.01); *F21V 31/03* (2013.01)

(58) Field of Classification Search
CPC .............. F21S 48/335; F21S 48/147; F21V 31/00–31/04
See application file for complete search history.

(56) References Cited

U.S. PATENT DOCUMENTS

| | | | | |
|---|---|---|---|---|
| 2011/0280035 | A1* | 11/2011 | Minami | B60Q 1/0094 362/547 |
| 2015/0070927 | A1* | 3/2015 | Kurahashi | F21S 48/335 362/546 |
| 2015/0096884 | A1* | 4/2015 | Shealy | C25B 9/10 204/252 |
| 2016/0369997 | A1* | 12/2016 | Johansen | F21V 31/03 |

FOREIGN PATENT DOCUMENTS

| | | | |
|---|---|---|---|
| JP | 2014161760 A | * 9/2014 | |
| JP | 2016097339 A | * 5/2016 | ............ B01D 53/26 |
| KR | 10-1998-044556 A | 9/1998 | |
| KR | 2017041298 A | * 4/2017 | |

* cited by examiner

*Primary Examiner* — Mariceli Santiago
(74) *Attorney, Agent, or Firm* — Morgan, Lewis & Bockius LLP

(57) ABSTRACT

A moisture electrolysis apparatus for a headlamp may include a first electrode connected to one electrode of a power supply, exposed to an internal space of a headlamp housing, and having a pillar shape; a second electrode connected to the other electrode of the power supply, exposed to the internal space of the headlamp housing, surrounding an outer peripheral surface of the first electrode and distanced from the first electrode by a predetermined distance to form a gap between the electrodes, and having a pillar shape; a dielectric coated on a surface of a one of the first electrode and the second electrode facing each other; and an electric discharge air duct formed between the first electrode and the second electrode, circulating air in the headlamp, and electrolyzing moisture in the air through an electric discharge phenomenon generated between the first electrode and the second electrode.

8 Claims, 5 Drawing Sheets

MOISTURE ELECTROLYSIS APPARATUS FOR HEADLAMP

CROSS-REFERENCE(S) TO RELATED APPLICATIONS

The present application claims priority to Korean Patent Application No. 10-2016-0170845, filed Dec. 14, 2016, the entire contents of which is incorporated herein for all purposes by this reference.

BACKGROUND OF THE INVENTION

Field of the Invention

The present invention relates to an apparatus for removing moisture formed in a headlamp through electrolysis.

Description of Related Art

Generally, as a light source in a headlamp of a vehicle emits light, the headlamp generates heat, wherein an internal portion of the headlamp is heated at a high temperature. Due to the temperature difference between an external surface of the headlamp, cooled by the influence of traveling wind or the surrounding environment, and the heated internal portion of the headlamp, moisture in the internal portion of the headlamp easily arrives at the condensing point, and a water drop is formed on an internal surface of a lens. When the water drop is formed and flows on the internal surface of the lens, the surrounding related components are corroded and damaged, or the water drop is repeatedly condensed and evaporated to leave a residue on a surface of the lens, wherein the lens becomes cloudy, thereby decreasing illuminance of the headlamp.

To prevent the problem described above, in the related art, a method of disposing a fan, or the like, in the headlamp to forcibly circulate the internal air of the headlamp or making an internal space of the headlamp vacuum sealed has been used. However, additional energy for driving the fan is consumed, costs are increased in the case of making the internal space of the headlamp vacuum sealed, and even though a light source simply needs to be replaced, the entire set of the headlamp is replaced wherein the repairing cost is very expensive.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus configured for solving the problem that moisture is condensed in a headlamp, and preventing the deterioration in performance of the headlamp by electrolyzing and removing moisture present in the headlamp housing.

An exemplary embodiment of the present invention is directed to providing a moisture electrolysis apparatus for a headlamp, including a first electrode connected to one electrode of a power supply, exposed to an internal space of a headlamp housing, and having a pillar shape; a second electrode connected to the other electrode of the power supply, exposed to the internal space of the headlamp housing, surrounding an outer peripheral surface of the first electrode and separated from the first electrode by a predetermined distance to form a gap between the first electrode and the second electrode, and having a pillar shape; a dielectric coated on a surface of any one of the first electrode and the second electrode facing each other; and an electric discharge air duct formed between the first electrode and the second electrode, circulating air in the headlamp, and electrolyzing moisture in the air through an electric discharge phenomenon generated between the first electrode and the second electrode.

A plurality of ventilation holes is configured to be formed in each of the first electrode and the second electrode.

Ventilation holes of the first electrode and the second electrode is configured to be formed to intersect with each other.

A moisture absorbent is configured to be disposed in an internal space of the first electrode.

The moisture electrolysis apparatus for a headlamp is configured to further include a heat conductor having a first surface penetrating through the headlamp housing to be exposed to an internal space of the first electrode, and a second surface on which heat radiation fins are disposed.

The moisture electrolysis apparatus for a headlamp is configured to further include an insulating housing fixing the first electrode and the second electrode to maintain the gap therebetween and blocking thermal connection between the first and second electrodes and the heat conductor.

The dielectric may be an ionomer.

The dielectric may be formed by impregnating an ionomer in a polytetrafluoroethylene (PTFE) film.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
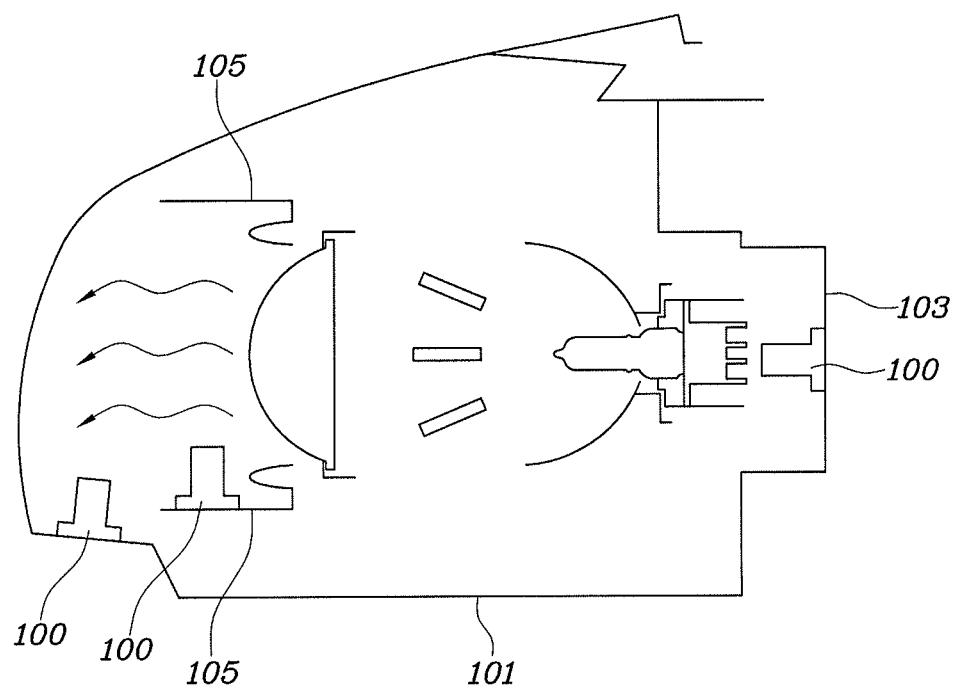
FIG. 1 is a conceptual diagram for a layout of a moisture electrolysis apparatus for a headlamp according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
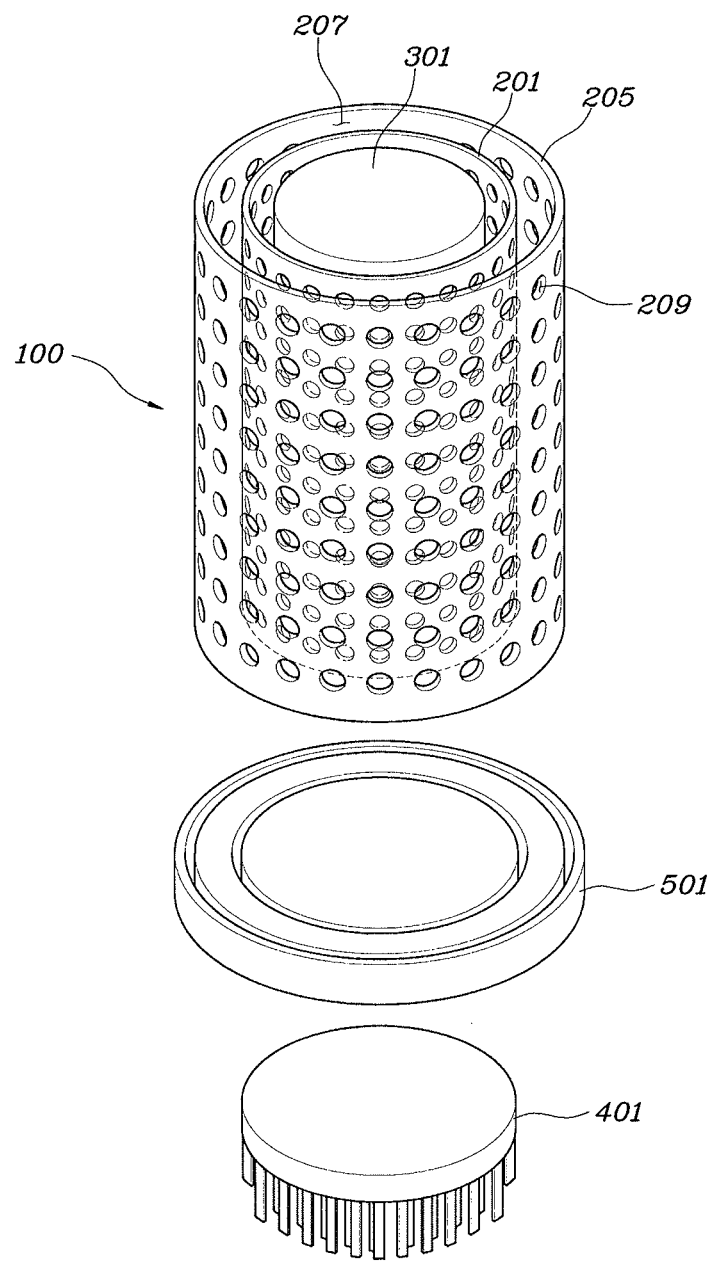
FIG. 2 is an exploded perspective view of the moisture electrolysis apparatus for a headlamp according to an exemplary embodiment of the present invention.
Figure 3:
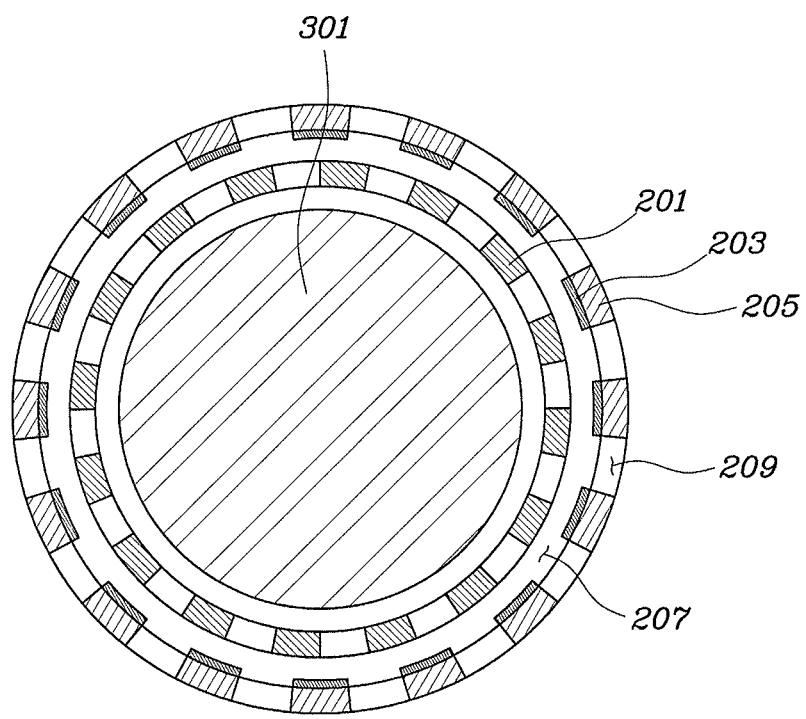
FIG. 3 is a plan view of the moisture electrolysis apparatus for a headlamp according to an exemplary embodiment of the present invention.
Figure 4:
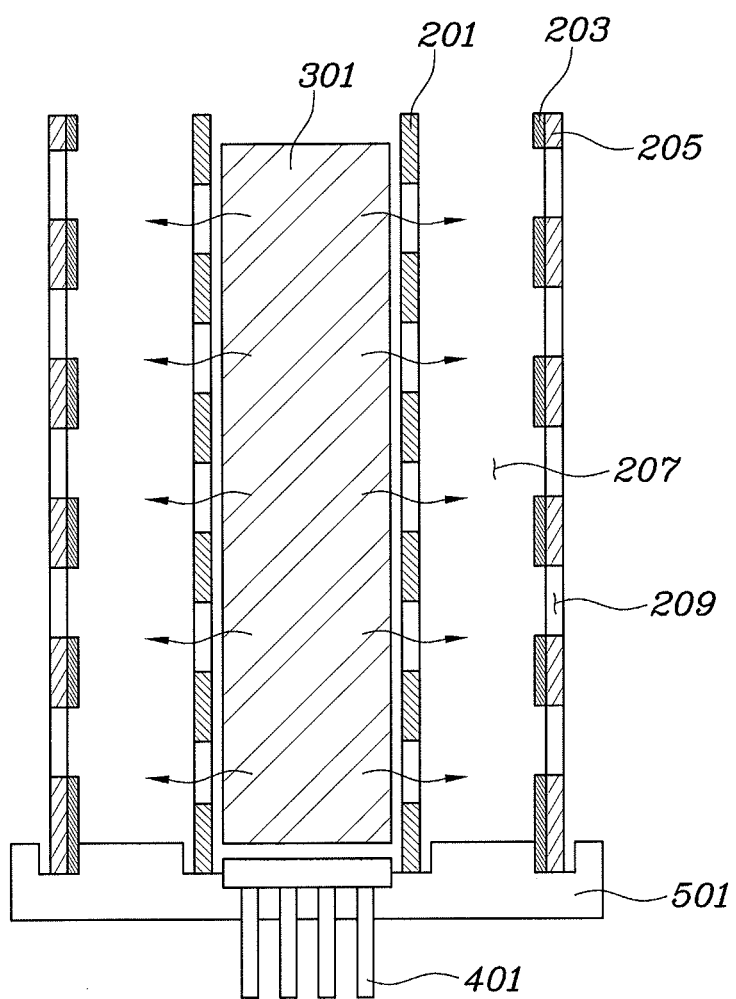
FIG. 4 is a cross-sectional view of the moisture electrolysis apparatus for a headlamp according to an exemplary embodiment of the present invention.
Figure 5:
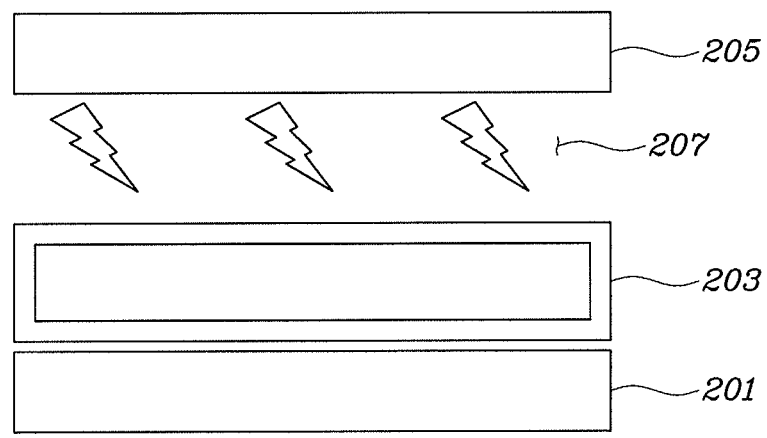
FIG. 5 is a conceptual diagram of an electric discharge principle of the moisture electrolysis apparatus for a headlamp according to an exemplary embodiment of the present invention.

FIG. 1 is a conceptual diagram for a layout of a moisture electrolysis apparatus for a headlamp according to an exemplary embodiment of the present invention, and FIG. 2 is an exploded perspective view of the moisture electrolysis apparatus for a headlamp according to an exemplary embodiment of the present invention. FIG. 3 is a plan view of the moisture electrolysis apparatus for a headlamp according to an exemplary embodiment of the present invention, FIG. 4 is a cross-sectional view of the moisture electrolysis apparatus for a headlamp according to an exemplary embodiment of the present invention, and FIG. 5 is a conceptual diagram of an electric discharge principle of the moisture electrolysis apparatus for a headlamp according to an exemplary embodiment of the present invention.

The moisture electrolysis apparatus 100 for a headlamp according to an exemplary embodiment of the present invention includes a first electrode 201 connected to one electrode of a power supply, exposed to an internal space of a headlamp housing 101 and having a pillar shape; a second electrode 205 connected to the other electrode of the power supply, exposed to the internal space of the headlamp housing 101, surrounding an outer peripheral surface of the first electrode 201 and separated from the first electrode 201 by a predetermined distance to form a gap between the first electrode 201 and the second electrode 205, and having a pillar shape; a dielectric 203 coated on a surface of any one of the first electrode 201 and the second electrode 205 facing each other; and an electric discharge air duct 207 formed between the first electrode 201 and the second electrode 205, circulating air in the headlamp and electrolyzing moisture in the air through an electric discharge phenomenon generated between the first electrode 201 and the second electrode 205.

There are two methods to lower humidity in the air. That is, there are a method of lowering relative humidity by raising the temperature of air, and a method of lowering absolute humidity by removing moisture in the air. The method of lowering the relative humidity may not be an ideal solution because moisture is again condensed in the headlamp in the case in which a temperature of an inner portion of the headlamp drops. Therefore, in an exemplary embodiment of the present invention, it is intended to remove the moisture in the headlamp by electrolysis.

In the general electrolysis of water, electrodes are inserted into water which includes an electrolyte to electrolyze the water. However, in a case of the headlamp, a space of moisture is limited, wherein electricity is not conducted. Therefore, it is impossible to electrolyze the moisture in the headlamp by a general electrolysis method.

Therefore the present invention intends to electrolyze the moisture in the air by inducing electric discharge at a low voltage.

Referring to FIG. 1, the moisture electrolysis apparatus 100 for a headlamp according to an exemplary embodiment of the present invention may be freely disposed in the internal space of the headlamp housing 101 when only a disposition area thereof is secured. However, it will be preferable to dispose the moisture electrolysis apparatus 100 for a headlamp at a position in which it is not directly observed from an outside thereof through the lens of the headlamp in consideration of the aesthetics of the assembly. For example, the moisture electrolysis apparatus 100 for a headlamp may be disposed at a position including a lower end of the headlamp housing 101, a bezel 105 of the headlamp, a dust cover 103, or the like.

In detail, referring to FIG. 2 to FIG. 4, the first electrode 201 is disposed to be connected to one electrode of the power supply, be formed in a pillar shape, penetrate through the headlamp housing 101, and be exposed to the internal space of the headlamp housing 101. The second electrode 205 is disposed to be connected to the other electrode of the power supply, be formed in a pillar shape, and be exposed to the internal space of the headlamp housing 101 as with the first electrode 201, but is disposed to have a larger diameter than that of the first electrode 201 to form the gap between the first electrode 201 and the second electrode 205 while surrounding the first electrode 201.

Although a current flows along conducting wires connected to each other, when a very high voltage is applied, even in a state in which conducting wires are disconnected from each other, electric discharge wherein electrons directly leap and are transferred between the conducting wires, which are disconnected from each other, is generated. However, to secure a voltage high to directly induce the electric discharge in a vehicle is not easy, and it is not preferable to induce the electric discharge through the high voltage in a vehicle in which a plurality of electronic components are present. Thus, it is required to generate the electric discharge at a low voltage.

A role of the dielectric 203 is to solve the above mentioned problem. Referring to FIG. 5, the dielectric 203 is coated on a surface of the electrode to allow the electric discharge to be uniformly generated over the entirety of the surface of the electrode, and helps the electrons to be easily emitted to induce generation of an electric discharge even at the low voltage.

The gap is formed between the first electrode 201 and the second electrode 205, wherein the electric discharge air duct 207 through which the air in the headlamp may pass is formed. The electric discharge is generated in the electric discharge air duct 207, and the air in the headlamp electrolyzes the moisture included in the headlamp while passing through a portion of the electric discharge air duct 207. Therefore, absolute humidity of the air in the headlamp may be lowered.

A plurality of ventilation holes 209 may be formed in each of the first electrode 201 and the second electrode 205. The ventilation holes 209 of the first electrode 201 and the second electrode 205 may be formed to intersect with each other.

The electric discharge air duct 207 formed between the first electrode 201 and the second electrode 205 has a very narrow clearance. In the case in which the gap between the first and second electrodes becomes large, an amount of air corresponding to a non-conductor is increased therefore increasing the resistance, wherein it is difficult to generate an electric discharge at the low voltage. Therefore, the gap is narrow (several millimeters or less), wherein the air in the headlamp may not be smoothly supplied to the electric discharge air duct 207.

Therefore, in an exemplary embodiment of the present invention, as illustrated in FIG. 2 to FIG. 4, the ventilation holes 209 are disposed in the electrodes themselves to allow the air to be smoothly supplied to the electric discharge air duct 207. In addition, the ventilation holes 209 formed in the first electrode 201 and the second electrode 205 are not aligned with each other, but are formed to intersect with each other to increase the time for which air introduced through the ventilation holes 209 stays in the electric discharge air duct 207, providing a time for which moisture in the air is electrolyzed.

A moisture absorbent 301 may be disposed in an internal portion of the first electrode 201.

When all the moisture in the headlamp is electrolyzed by the moisture electrolysis apparatus 100 for a headlamp, there is no problem. However, a considerable time period is required for all the moisture in the headlamp to be supplied to and electrolyzed in the moisture electrolysis apparatus 100 for a headlamp by a natural diffusion method. In addition, in the case in which a driving the vehicle stops, the operation of the moisture electrolysis apparatus 100 for a headlamp is also stopped, and the time period required is further increased to remove the moisture.

In the present case, the moisture absorbent 301 may be provided to remove the moisture in the headlamp. However, the amount of the moisture absorbent 301 is limited, wherein there is a limitation in removing the moisture by moisture absorbent 301 over time.

Desiccant, calcium chloride, silica gel, or the like may be used as the moisture absorbent 301, and absorb and hold moisture in the air, and again discharging the held moisture in the case in which heat is applied from an outside thereof.

In a case of the present invention, during a period in which an electric discharge is generated by power applied to the first electrode 201 and the second electrode 205, heat is generated in the first electrode 201 and the second electrode 205. The moisture held in the moisture absorbent 301 is discharged by the heat, and is then electrolyzed and removed while passing through the electric discharge air duct 207.

The moisture electrolysis apparatus 100 for a headlamp may further include a heat conductor 401 having one surface penetrating through the headlamp housing 101 to be exposed to the internal portion of the first electrode 201 and the other surface on which heat radiation fins are formed.

The temperature of an internal portion of the headlamp housing 101 is raised by a lamp, which is a light source, and the greenhouse effect, wherein the temperature of an external portion of the headlamp housing 101 is relatively low. Therefore, the external portion of the headlamp housing 101, of which the temperature is low, and the headlamp housing 101 are thermally connected to each other using the heat conductor 401, making it possible to allow the moisture in the headlamp discharged to the internal portion of the first electrode 201 to be condensed on the other surface of the heat conductor.

The condensed moisture is absorbed by the moisture absorbent 301 and discharged through the heat generated in the first electrode 201 operated in the moisture electrolysis apparatus 100 for a headlamp to be thus electrolyzed.

The moisture electrolysis apparatus 100 for a headlamp may further include an insulating housing 501 fixing the first electrode 201 and the second electrode 205 to maintain the gap therebetween, and blocking thermal connection between the first and second electrodes 201 and 205 and the heat conductor 401.

A short circuit between the first and second electrodes 201 and 205 due to direct contact between the first and second electrodes 201 and 205 must be prevented. When the heat generated in the first and second electrodes 201 and 205 during an operation of the first and second electrodes 201 and 205 is transferred to the heat conductor 401, efficiency of the heat conductor 401 is decreased. Therefore, in an exemplary embodiment of the present invention, as illustrated in FIG. 2 to FIG. 4, the first and second electrodes 201 and 205 are fixed to maintain a predetermined gap therebetween through the insulating housing 501, and the thermal connection between the first and second electrodes 201 and 205 and the heat conductor 401 is blocked by the insulating housing 501.

The dielectric 203 may be an ionomer.

The dielectric 203 is configured to assist in the movement of electrons to allow an electric discharge to be efficiently generated even at the low voltage.

The ionomer is a polymer material including positive and negative electric charges. In more detail, the ionomer is a thermoplastic material simultaneously possessing a covalent bond and an ionic bond, and has very strong electrostatic force. The dielectric 203, which is essentially a plastic polymer material, has a property of an insulator but assists in movement of the electrons on the basis of the excellent electrostatic force to assist in the electric discharge at the low voltage.

The dielectric 203 may be formed by impregnating the ionomer in a polytetrafluoroethylene (PTFE) film.

Due to the characteristics of the abovementioned dielectric 203 mounted in the headlamp of the vehicle, a high durability wherein the performance is maintained even though the dielectric 203 is exposed to various temperature changes, moisture, vibrations, and the like, for a long time period is required in the dielectric 203.

Therefore, in an exemplary embodiment of the present invention, the ionomer is impregnated in the polytetrafluoroethylene (PTFE) film, that is, a porous Teflon film, which is not easily stripped even at the time of being plated without a change in chemical characteristics at a high temperature (300° C. or more), to coat the dielectric on the electrode. Therefore, durability of the coated dielectric may be improved while maintaining the excellent electrostatic force of the ionomer.

By means of the moisture electrolysis apparatus for a headlamp, according to an exemplary embodiment of the present invention as described above, the moisture condensed in a headlamp may be removed to prevent deterioration in the performance of the headlamp, and even though air having a high humidity is introduced into the headlamp when replacing an electric bulb in the headlamp or repairing the headlamp, the problem wherein moisture is condensed does not occur.

For convenience in explanation and accurate definition in the appended claims, the terms "upper", "lower", "upwards", "downwards", "front", "rear", "back", "inside", "outside", "inwardly", "outwardly", "interior", "exterior", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A moisture electrolysis apparatus for a headlamp, including:
   a first electrode connected to one electrode of a power supply, exposed to an internal space of a headlamp housing, and having a pillar shape;
   a second electrode connected to the other electrode of the power supply, exposed to the internal space of the headlamp housing, surrounding an outer peripheral surface of the first electrode and spaced from the first electrode by a predetermined distance to form a gap between the first electrode and the second electrode, and having a pillar shape;
   a dielectric coated on a surface of one of the first electrode and the second electrode facing each other; and
   an electric discharge air duct formed between the first electrode and the second electrode, circulating air in the headlamp, and electrolyzing moisture in the air through an electric discharge phenomenon generated between the first electrode and the second electrode.

2. The moisture electrolysis apparatus for the headlamp of claim 1, wherein a plurality of ventilation holes is formed in each of the first electrode and the second electrode.

3. The moisture electrolysis apparatus for the headlamp of claim 1, wherein ventilation holes of the first electrode and the second electrode are formed to intersect with each other.

4. The moisture electrolysis apparatus for the headlamp of claim 1, wherein a moisture absorbent is provided in an internal portion of the first electrode.

5. The moisture electrolysis apparatus for the headlamp of claim 1, further including a heat conductor having a first surface penetrating through the headlamp housing to be exposed to an internal portion of the first electrode and a second surface on which heat radiation fins are formed.

6. The moisture electrolysis apparatus for the headlamp of claim 5, further including an insulating housing fixing the first electrode and the second electrode to maintain the gap therebetween and blocking thermal connection between the first and second electrodes and the heat conductor.

7. The moisture electrolysis apparatus for the headlamp of claim 1, wherein the dielectric is an ionomer.

8. The moisture electrolysis apparatus for the headlamp of claim 1, wherein the dielectric is formed by impregnating an ionomer in a polytetrafluoroethylene (PTFE) film.

* * * * *